United States Patent [19]

Erdman

[11] Patent Number: 5,041,775
[45] Date of Patent: Aug. 20, 1991

[54] SPEED CONTROL FOR MULTITAP INDUCTION MOTOR

[75] Inventor: John L. Erdman, Eden Prairie, Minn.

[73] Assignee: Honeywell Inc., Minneapolis, Minn.

[21] Appl. No.: 504,736

[22] Filed: Apr. 3, 1990

Related U.S. Application Data

[63] Continuation of Ser. No. 239,452, Sep. 1, 1988, abandoned.

[51] Int. Cl.⁵ .............................................. H02P 7/36
[52] U.S. Cl. .................................. 318/812; 307/135; 318/775
[58] Field of Search ........ 318/340, 351, 354, 417–422, 318/814, 813, 812, 775–777; 361/2, 3, 13, 166, 169, 189; 307/135, 132 E, 141.8; 323/340, 341

[56] References Cited

U.S. PATENT DOCUMENTS

| | | | |
|---|---|---|---|
| 1,281,826 | 10/1918 | Philippi | 361/3 |
| 1,850,321 | 3/1932 | Greenwood | 361/13 |
| 1,961,793 | 6/1934 | Schaefer | 318/775 |
| 2,355,998 | 8/1944 | Palme | 323/341 |
| 3,150,293 | 9/1964 | Fransson et al. | 317/141 |
| 4,008,423 | 2/1977 | Christianson et al. | 318/139 |
| 4,015,142 | 3/1977 | Nagaoka et al. | 307/247 |
| 4,095,123 | 6/1978 | Takahashi | 307/115 |
| 4,226,581 | 10/1980 | Schilling | 431/26 |
| 4,388,581 | 6/1983 | Bhatnagar | 318/789 |
| 4,490,768 | 12/1984 | Mori et al. | 361/2 |
| 4,713,716 | 12/1987 | Takemura et al. | 361/2 |
| 4,737,701 | 4/1988 | Hoemann et al. | 318/772 |

Primary Examiner—David Smith, Jr.
Attorney, Agent, or Firm—Kinney & Lange

[57] ABSTRACT

A control circuit for controlling the speed of a tapped winding motor that includes a set of motor speed selection relays, and a normally open relay connected in series with the set of motor speed selection relays. The motor speed selection relays are connected to the tapped windings of the motor for varying speed of the motor. A microprocessor controls energization of the relay windings upon request for a change in motor speed so that the normally open relay is open before and during any change of state of the motor speed selection relays corresponding to the requested change in motor speed.

8 Claims, 2 Drawing Sheets

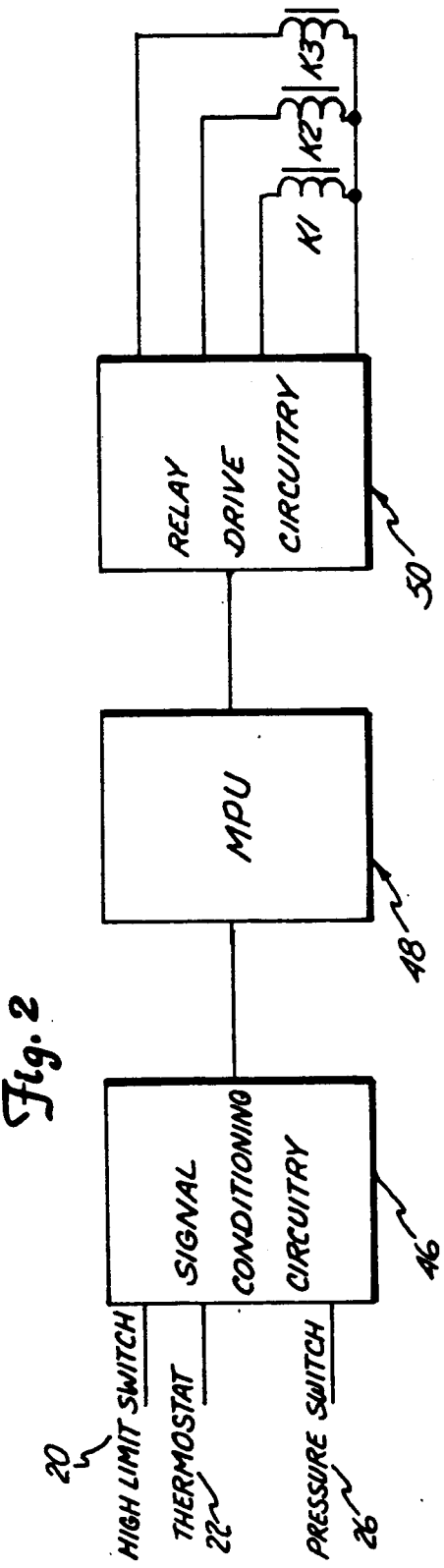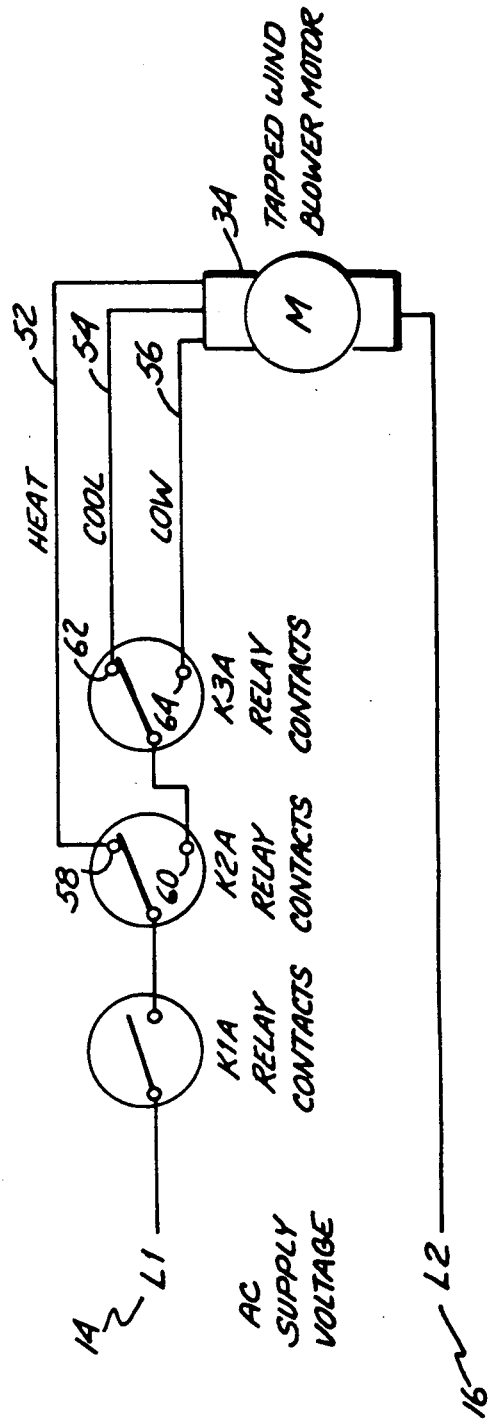

SPEED CONTROL FOR MULTITAP INDUCTION MOTOR

This is a continuation of application Ser. No. 07/239,452 filed on Sept. 1, 1988, abandoned as of the data of this application.

REFERENCE TO COPENDING APPLICATION

Reference is hereby made to my copending applications entitled "DIGITAL CONTROLLER COMPONENT FAILURE DETECTION FOR GAS APPLIANCE IGNITION FUNCTION", Ser. No. 07/239,450; "SAFETY RELATED PARAMETER INPUTS FOR MICROPROCESSOR IGNITION CONTROL", Ser. No. 07/239,453; "CONTROL SYSTEM FOR FORCED COMBUSTION AIR HEATING APPLIANCE" Ser. No. 07/239,451 which are filed on even date with this application and are assigned to the same assignee.

BACKGROUND OF THE INVENTION

1. Field of the Invention

The present invention relates to ignition controllers for gas-fired forced combustion air heating appliances, and more particularly to a relay sequencing apparatus and method for controlling a multiple tap induction motor to provide different motor speeds.

2. Description of the Prior Art

With past conventional controls of fractional horsepower induction or permanent-split-capacitance motors, typically used in residential circulating fan appliances, the starting or speed changing of these motors is done without any intelligent control. When starting the motor winding taps or changing between motor winding taps to change motor speed, high load currents pass through the mechanical relay contacts that perform the switching. In order to randomly change motor speed at any time, the relay corresponding to the desired motor speed must be powered directly. Due to the lack of intelligent control, all the relay contacts must be capable of making or breaking the motor load current. The relay contact requirements in a typical central heating furnace eliminate many lower cost relays from consideration because all the relay contacts must make or break the load current for a large number of switching cycles.

The major drawback in using lower cost relays is that they have a much lower current switching capacity on their normally closed contacts than on their normally open contacts. These lower cost relays can carry high load currents with the normally closed contacts, but if they must make or break the current with the normally closed contacts they tend to have premature contact welding failures. These failures occur because the normally closed contacts must only rely on magnetic forces to overcome both mechanical spring forces (which bias the contacts toward a normally closed state) and welding forces (which occur as the contacts begin to open) in order to open the contacts.

SUMMARY OF THE INVENTION

The control circuit of the present invention includes a set of motor speed selection relay contacts, a normally open energization control relay contact, relay windings for controlling states of the relay contacts, and means for controlling energization of the windings. The set of motor speed selection relay contacts are connected to tapped windings of the motor, and the normally open energization control relay contact is connected in series with the set of motor speed selection relay contacts.

In one embodiment of the present invention, the set of motor speed selection relays comprise two relay contacts which are configured such that they can select any one of three different motor speeds. The motor speed selection relay contacts only route current to the tapped windings of the motor, and never make or break the load current. The normally open energization control relay contact, connected in series with the motor speed selection relay contacts, makes or breaks the load current to the motor speed selection relay contacts and thus to the tapped windings of the motor. This eliminates arc welding of the motor speed selection relay contacts because they do not have to make or break the load current. Therefore, the lives of these contacts are extended and lower cost relays can be used.

The means for controlling energization of the windings preferably comprises a microprocessor which selectively energizes the windings of the motor speed selection relays and the energization control relay. If inputs connected to the microprocessor request a change in motor speed, the microprocessor momentarily de-energizes the energization control relay, thus breaking the current to the motor. After a short delay, the microprocessor selects the requested motor speed by energizing the appropriate motor speed selection relays. After another short delay, the microprocessor re-energizes the energization control relay to close its normally open contacts, thus providing power to the motor speed selection relays and the motor.

BRIEF DESCRIPTION OF THE DRAWINGS

FIG. 2 is part of the ignition controller of FIG. 1 showing the control circuit of the present invention which comprises relay windings connected to the relay control logic of .

FIG. 3 is part of the ignition controller of FIG. 1 showing the relay contacts and the tapped winding motor of the control circuit of the present invention.

DETAILED DESCRIPTION OF THE PREFERRED EMBODIMENTS

Figure 1:
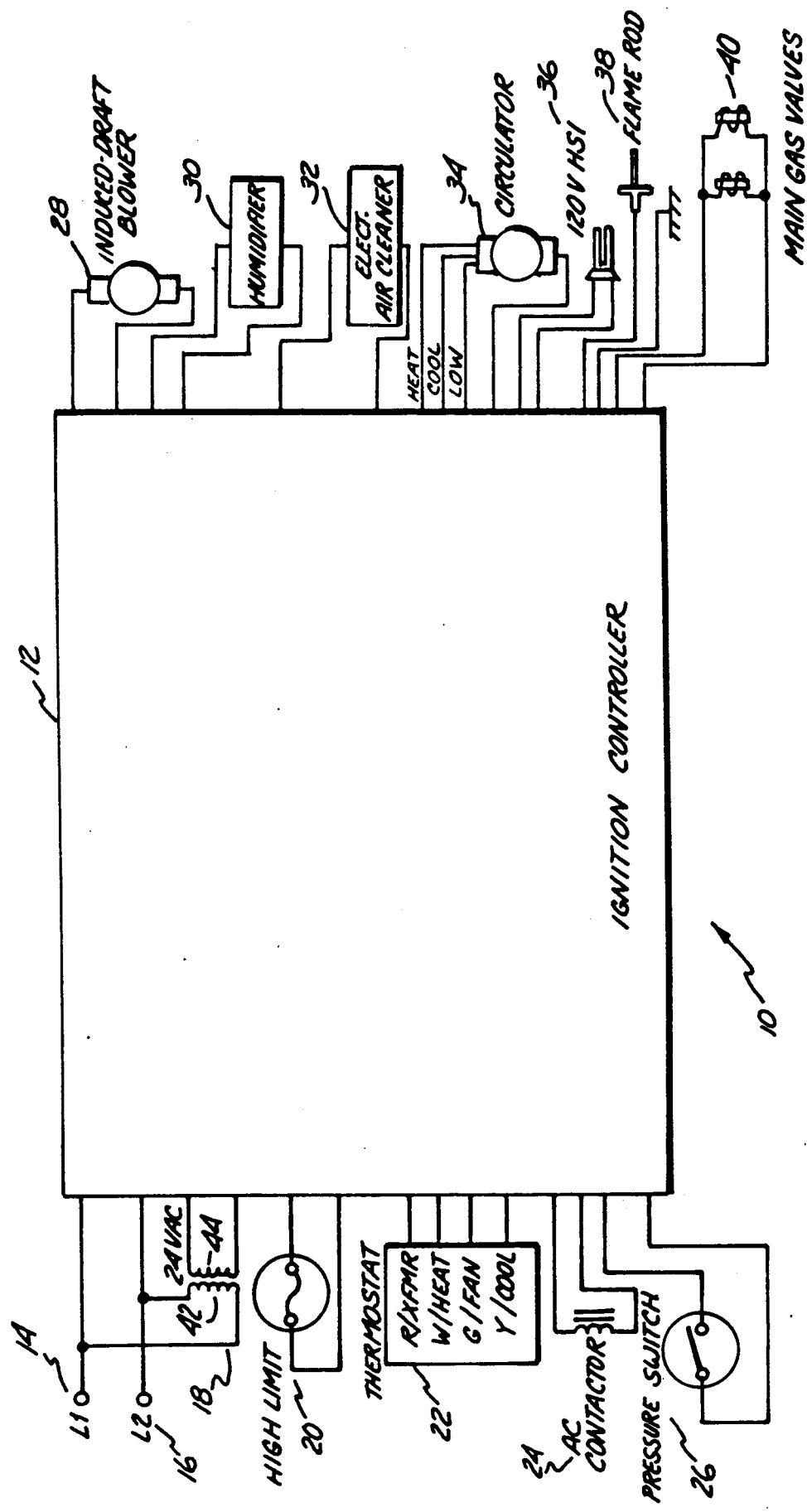
FIG. 1 shows the heating and air conditioning system which comprises the ignition controller connected to various inputs and outputs.

Heating and air conditioning control system 10 shown in FIG. 1 includes ignition controller 12, a pair of AC power terminals 14 and 16, step down transformer 18, high limit thermal switch 20, thermostat 22, air conditioning contactor 24, combustion air proving pressure switch 26, induced draft combustion air blower 28, humidifier 30, electrostatic air cleaner 32, circulator fan motor 34, hot surface ignitor 36, flame rod 38, and main gas valves 40. Control system 10 is preferably used for a gas-fired central heating furnace which may be used in a typical residence. The furnace is a high-efficiency type furnace using induced draft forced combustion air (provided by induced blower 28) and features an electronic ignition (through hot surface ignitor 36).

Control system 10 is powered by single phase 120 volt, 60 Hz AC voltage which is received at power terminals 14 and 16. Step down transformer 18 has its primary winding 42 connected to terminals 14 and 16 and its secondary winding 44 connected to ignition controller 12 to provide a source of 24 volt, 60 Hz AC voltage. High limit switch 20, thermostat 22, AC contactor 24, pressure switch 26, and gas valves 40 operate on 24 volt AC power under the control of ignition controller 12. Induced draft blower 28, humidifier 30, electrostatic air cleaner 32, circulator fan 34, hot surface ignitor 36, and flame rod 38 all operate on 120 volt AC power provided through ignition controller 12. A more detailed description of the internal components and the operation of ignition controller 12 is provided in the copending patent application entitled "CONTROL SYSTEM FOR FORCED COMBUSTION AIR HEATING APPLIANCE."

FIG. 2 is a diagram showing part of the internal circuitry of ignition controller 12 shown in FIG. 1. FIG. 2 shows signal conditioning circuitry 46, which receives inputs from high limit switch 20, thermostat 22, and pressure switch 26. FIG. 2 also shows microprocessor 48, relay drive circuitry 50, and relay coils K1, K2, and K3. As is described in more detail in my copending patent application entitled "CONTROL SYSTEM FOR FORCED COMBUSTION AIR HEATING APPLIANCE" microprocessor 48 receives several inputs from signal conditioning circuitry 46, and has various outputs connected to relay drive circuitry 50, as well as other related circuitry of ignition controller 12. My copending patent application entitled "CONTROL SYSTEM FOR FORCED COMBUSTION AIR HEATING APPLIANCE" also describes in more detail signal conditioning circuitry 46, microprocessor 48, and relay drive circuitry 50.

FIG. 3 shows part of the control circuit of the present invention, including relay contacts K1A, K2A, K3A, and circulator fan motor 34. Relay contacts K2A and K3A are connected to motor taps 52, 54, and 56 of circulator fan motor 34. The control circuit is powered by single phase 120 volt, 60 Hz AC voltage which is received at power terminals 14 and 16.

Relay contact K1A is a normally open energization control relay contact which makes or breaks the load current to relay contacts K2A and K3A and to circulator fan motor 34. Relay contacts K2A and K3A only route current to motor taps 52, 54, 56 of circulator fan motor 34, and never make or break the load current to circulator fan motor 34. Relay contacts K2A include normally closed contact 58 and normally open contact 60. Similarly, relay contacts K3A include normally closed contact 62 and normally open contact 64.

The control circuit of the present invention included in ignition controller 12 uses an intelligent method of relay control which allows for the use of relays which are twenty-five to fifty percent less costly than the conventional control type relay used with multitap winding motors. A major drawback in using these lower cost relays is that they have much lower current switching capacity on their normally closed contact than on their normally open contact. The lower cost relays can carry high load currents with the normally closed contacts, but if they must make or break the load current with their normally closed contacts, they fail due to premature contact welding. These lower cost relays must rely only on magnetic forces to overcome both the mechanical spring forces and the weld forces to open the normally closed contacts. The present invention overcomes this limitation of lower cost relays by making use of normally open contact K1A in series with contacts K2A and K3A.

The operation of the control circuit of the present invention is generally as follows. Thermostat 22 sends signals to microprocessor 48 which determine the desired speed of circulator fan motor 34. The signals from thermostat 22 are processed through signal conditioning circuitry 46, such that signal conditioning circuitry 46 provides signals to microprocessor 48 which indicate the status of thermostat 22 and other components of system 10. Microprocessor 48 then sends an output signal which runs through relay drive circuitry 50 and de-energizes coil K1, which in turns opens normally open energization control relay contacts K1A. This breaks the load current to motor speed control relay contacts K2A and K3A, and to circulator fan motor 34. However, circulator fan motor 34 has enough mass momentum to continue running as circulator fan motor 34 changes speed. Circulator fan motor 34 continues to run because it takes only about 50 to 200 milliseconds to turn off, change states of one or both motor speed control relays contacts K2A and K3A,, and turn back on circulator fan motor 34.

After microprocessor 48 has de-energized relay coil K1 and thus opened relay contact K1A, it provides a short delay time to suppress any arc current across relay contact K1A. Microprocessor 48 then sends a signal to either relay K2 or relay K3 (or both), depending on the requested motor speed. Relay contacts K2A have normally closed contact 58 connected to motor tap 52 of circulator fan motor 34 and normally open contact 60 connected to relay contacts K3A. Normally closed contact 62 of K3A is connected to motor tap 54, and normally open contact 64 is connected to motor tap 56. If the requested motor speed is the "heat" speed provided by motor tap 52, microprocessor 48 sends a signal to de-energize relay coils K2 and K3, which leaves relay contacts K2A and K3A in their normally closed positions. If the requested motor speed is the "cool" speed provided by motor tap 54, microprocessor 48 energizes relay winding K2 which opens relay contact K2A, and microprocessor 48 de-energizes relay winding K3 which leaves relay contact K3A in its normally closed position connected to motor tap 54 of circulator fan motor 34. If the requested motor speed is the "low" speed provided by motor tap 56, microprocessor 48 energizes both relay windings K2 and K3, which closes normally open contacts 60 and 62 K2A and K3A.

After the requested change in motor speed occurs, microprocessor 48 provides a short delay time to ensure that either relay contact K2A or K3A has properly changed states before relay K1 is re-energized. Microprocessor 48 then sends a signal to re-energize relay winding K1 which closes relay contact K1A, and provides the load current to relay contacts K2A and K3A and the selected winding tap 52, 54 or 56 of circulator fan motor 34.

As can be seen, relay contacts K2A and K3A change state only when relay contacts K1A are open. This allows less expensive relay contacts to be used for relay. connects K2A and K3A, since they only carry current, and do not make or break the load current. This avoids the possibility of relay contact welding of the normally closed contacts 58 and 62 of relays K2A and K3A. Relay contact K1A, a normally open contact, is thus the only expensive relay contact that is needed. This design differs from prior art relay control circuits in that the prior art relay control circuits require the use of expensive relay contacts similar to that of relay contact K1A for all relays used.

Although the present invention has been described with reference to preferred embodiments, workers skilled in the art will recognize that changes may be made in form and detail without departing from the spirit and scope of the invention.

What is claimed is:

1. A control circuit for controlling speed of a multitap winding alternating-current (AC) circulator fan motor, the control circuit comprising:

a supply terminal;

a plurality of motor speed selection relay contacts connected to individual winding taps of the motor for selecting the speed of the motor and including at least one normally closed relay contact, the motor speed selection relay contacts defining an individually selectable current path for each winding tap;

a normally open power control relay contact connected between the set of motor speed selection relay contacts and the supply terminal for controlling supply of AC power from the supply terminal to the motor through each winding tap and each motor speed selection relay contact;

relay coils for controlling states of the motor speed selection relay contacts and the normally open relay contact;

relay drivers connected to the relay coils;

microprocessor means connected to the relay drivers for controlling energization of the relay coils with control signals applied to the relay drivers such that the normally open power control relay contact is open for a selection time period which starts before and continues during any change of state of the motor speed selection relay contacts;

wherein the microprocessor means provides a first delay time, after it receives a request for a change in motor speed and after it opens the normally open relay contact, to suppress any arc current across the unpowered normally open relay contact before it causes a change of state to occur in any of the motor speed selection relay contacts to prevent welding of the normally closed relay contact; and wherein the microprocessor means provides a second delay time, after it receives the request for a change in motor speed, before causing the normally open relay contact to close to ensure that the motor speed selection relay contacts have changed states.

2. The control circuit of claim 1 wherein the motor speed selection relay contacts include a first normally closed relay contact connected in a first current path between a power control relay contact and a first winding tap, a first normally open relay contact connected in a second current path between the power control relay contact and a second winding tap, a second normally open relay contact connected between the power control relay contact and both the first normally open and first normally closed relay contacts, and a second normally closed relay contact in a third current path between the power control relay contact and a third winding tap.

3. A control circuit for controlling speed of a multitapped winding alternating-current (AC) circulator fan motor, the control circuit comprising:

a source terminal;

motor speed selection relay means connected to tapped windings of the motor for selecting speed of the motor and including at least one normally closed relay contact;

power control relay means, connected between the source terminal and the motor speed selection relay means, for providing AC power from the source terminal to the motor through the motor selection relay means and to each tapped winding; and means for controlling the motor speed selection relay means and the power control relay means such that the power control relay means is open for a selection time period starting before and continuing during any change of state of the motor speed selection relay means, the means for controlling providing a delay time after causing the power control relay means to open to suppress any arc current across the power control relay means before causing a change of states of the motor speed selection relay means to prevent welding of the normally closed relay contact.

4. The control circuit of claim 3 wherein the motor speed selection relay means comprises a plurality of motor speed selection relay contacts individually connected to different winding taps of the motor, with corresponding relay coils for controlling states of the relay contacts.

5. The control circuit of claim 4 wherein the power control relay means comprises a normally open relay contact with a corresponding relay coil for controlling the normally open relay contact.

6. The control circuit of claim 5 wherein the normally open relay contact makes or breaks load current powering the motor speed selection relay means and the windings of the motor.

7. A method of controlling speed of a multitap winding alternating-current (AC) circulator fan motor, the method comprising:

opening, for a selection time period, a power control relay contact connected between a set of motor speed selection relay contacts and a supply terminal to break an AC current path between the supply terminal and the set of motor speed selection relay contacts so that each relay contacts is in a no current load condition during the selection time period;

controlling states of individual, normally open and normally closed motor speed selection relay contacts connected between the power control relay contact and individual winding taps of the motor during the selection time period for selecting an AC current path from the power control relay contact to individual winding taps to select the motor speed;

providing a first delay time, between the step of opening a power control relay contact and the step of controlling states of individual motor speed selection relay contacts, to suppress any arc current across the unpowered motor speed selection relay contacts and prevent welding of the normally closed motor speed selection relay contacts;

closing the power control relay contact after the selection time period to make the AC current path between the supply terminal and the set of motor speed selection relay contacts; and providing a second delay time, between the step of controlling states of individual motor speed selection relay contacts and the step of closing the power control relay contact, to ensure the motor speed selection relay contacts have changed states.

8. A control circuit in a combustion air heating appliance for controlling speed of a multi-tap winding alternating-current (AC) circulator fan motor having individual winding taps associated with HEAT, COOL, and LOW speeds, the control circuit comprising:

a supply terminal;

a plurality of motor speed selection relay contacts connected to the individual winding taps of the motor for selecting the speed of the motor and including at least one normally closed relay contact, the motor speed selection relay contacts defining an individually selectable AC current path for each winding tap;

a normally open power control relay contact connected between the set of motor speed selection relay contacts and the supply terminal for controlling supply of AC power from the supply terminal to the motor through each selectable AC current path;

relay coils for controlling states of the motor speed selection relay contacts and the normally open power control relay contacts;

relay driers connected to the relay coils for controlling energization of the relay coils;

a microprocessor connected to the relay drivers for controlling operation of the relay drivers such that the normally open power control relay contact is open for a selection time period which starts before and continues during any change of state of the motor speed selection relay contacts, wherein the microprocessor provides a first delay time after it receives a request for a change in motor speed to suppress any arc current across the unpowered normally open relay contact before it causes a change of state to occur in any of the motor speeds selection relay contacts to prevent welding of the normally closed relay contacts, and wherein the microprocessor provides a second delay time after it receives the request for a change in motor speed before causing the normally open relay contact to close to ensure that the motor speed selection relay contacts have changed states; and a thermostat connected to the microprocessor for providing status signals which cause the microprocessor to select between the HEAT, COOL and LOW speeds of the circulator fan motor.

* * * * *